United States Patent Office 2,969,409
Patented Jan. 24, 1961

2,969,409
PROCESS OF VULCANIZING RUBBER COMPOSITION CONTAINING LIGHT-COLORED FILLER AND QUATERNARY ALKYL-PYRIDINE COMPOUND

Willy Lautsch, 19–21 Amselstrasse, Berlin-Dahlem, Germany, and Rudolf Kern, 18 Maxburstrasse, Neustadt/Haardt, Germany No Drawing. Filed Nov. 19, 1956, Ser. No. 622,829

8 Claims. (Cl. 260—765)

This invention relates to a process for the manufacture of rubber vulcanizates, the present application being a continuation-in-part of our application Serial No. 231,425, filed June 13, 1951, now abandoned, and entitled: "Manufacturing rubber and synthetic compositions."

It is among the objects of our present invention to generally improve rubber vulcanizates and to provide new mixtures of ingredients to start with to produce the improved vulcanizates.

Other objects of this invention will appear from the following description.

In accordance with the invention, speaking in broad terms, natural rubber is vulcanized together with certain organic addition agents and light-colored hydrophilic fillers.

As the referred to addition agents, compounds are used which contain such reactive groups as will split off under the condition of vulcanization. Best results were obtained with alkyl-pyridine salts in which an alkyl group is attached to a methylene group and the methylene group, in turn, is attached to the nitrogen in the pyridine ring. The alkyl group and methylene group are linked by a functional group, such as, for instance, —O— or —CO—NH—. Under the conditions prevailing during vulcanization, the alkyl-pyridine salts readily split into the pyridine salt and the respective radical. As examples of N-alkyl-pyridine compounds having —O— as the functional group, we list alkyl-oxymethylene-pyridine salts, such as decyl-oxymethylene pyridine chloride and octadecyl-oxymethylene-pyridine chloride. As examples showing the functional —CO—NH— group, we refer to the fatty acid aminomethylene-pyridine salts, such as the stearamido-methylene-pyridine salt, the fatty acid of the latter salt containing at least 24 carbon atoms in the molecule, or derivatives alkylated at the amido nitrogen, such as fatty acid N-alkyl-amidomethylene pyridine salts, for example oleoyl-N-methyl-amidomethylene pyridine chloride. It is to be fully noted that the referred to alkyl-pyridine salts may be substituted in any way.

As light-colored hydrophilic fillers, synthetically produced oxides, as well as synthetically produced hydrates, of polyvalent metals are used. We mention pyrogenic or precipitated pure silica as examples of said oxides, and hydrated aluminum oxides, such as alumina gel and aluminum sulfhydrate as said hydrates. Aluminum sulfhydrate has the formula $Al_6(OH)_{18}(H_2O)_5SO_4$ and is sold under the name "Teg Spezial" by the firm Giulini. In addition to being light-colored, synthetically produced, hydrophilic, our fillers are highly dispersable and have a very high "looseness index."

It is an important feature of our invention that the addition agents and fillers, as used according to the invention, have a synergistic effect. While the use of the addition agents of our invention as rubber compounding ingredients are most effective in improving the physical properties of raw rubber, we have found that the simultaneous use of our addition agents and fillers imparts to the vulcanizates mechanical properties which until now could not be achieved. Especially the structural strength of the vulcanizates is increased substantially.

As far as our fillers for the purposes of the invention are concerned, they differ fundamentally from natural fillers, such as clay, kaolin, etc. The peculiarity of our fillers is due to the fact that they are synthetically produced. The difference between our fillers and natural fillers is not only one of purity, our fillers being of the highest purity, but, according to modern concepts, one of constitution. All synthetically produced reinforcing fillers contain varying amounts of combined water as a basic condition of their effectiveness. We have found that if such water is removed, the effectiveness is lost, which is due to the destruction of the previous complex structure. We believe, although this may be considered an empirical discovery without regard to theory, that the referred to combined water of our fillers, among other causes, such as uniformity in composition, contributes to the cooperative action, when our fillers and our addition agents are used together, and is at least partly responsible for the exceedingly beneficial results of the process of the invention.

Our addition agents have the additional advantage that they do not decompose at the working temperature in the presence of water. They may, therefore, be added to the rubber formulations either pure or in form of aqueous solutions, emulsions, or pastes, with or without a further addition of water, and with or without softeners or other rubber compounding ingredients.

The quantity of the compounding ingredients to be used according to the process of our invention may vary widely. It depends on the nature of the materials serving as a dispersing agent, on the kind and quantity of the filler present in the mixture, and on the desired physical and technical properties of the rubber vulcanizate to be produced. The quantity is determined so as to add to the filler used in the rubber formulation the most advantageous dispersing agent so that the rubber vulcanizate may have the most desirable properties.

The examples given below shall serve as illustrations of the method of the invention but are not intended to limit its scope. They will show that the compounding ingredients of the invention produce improvements in mechanical properties which may reach a multiple of the results obtained in blank runs.

Example 1

This example shows the influence of octadecyl-oxymethylene-pyridine chloride on the strength of a rubber composition containing alumina gel ("Teg Guilini N Spezial) as a reinforcing filler.

The following formula was used (parts by weight):

| | |
|---|---|
| Crepe rubber | 100 |
| Zinc oxide, active | 3 |
| Sulfur | 3 |
| Mercaptobenzothiazole disulfide | 1 |
| Diphenyl-guanidine | 0.5 |
| Alumina gel | 60 |
| Octadecyl-oxymethylenepyridine chloride | 3.6 |

After vulcanization for 20 minutes, the following physical properties were ascertained, which are compared with those of a vulcanizate made without the addition of octadecyl-oxymethylene-pyridine chloride:

|  | Without | With |
|---|---|---|
|  | Octadecyl-oxymethylene-pyridine chloride | |
| Shore hardness | 55 | 51 |
| Tear resistance, kg./cm | 16 | 31 |
| Cut growth resistance, kg./cm | 50 | 53 |
| Modulus at 300%, kg./cm.² | 68 | 53 |
| Modulus at 500%, kg./cm.² | 167 | 150 |
| Breaking strength, kg./cm.² | 178 | 207 |
| Elongation, percent | 517 | 590 |

Example 2

This example shows the favorable effect of a decyl-oxymethylene-pyridine salt, with the use of alumina gel as a light-colored reinforcing filler, on the structural properties of a rubber composition.

The following formula was used:

| | |
|---|---|
| Crepe rubber | 100 |
| Zinc oxide, active | 5 |
| Sulfur | 3 |
| Reaction product of mercaptobenzothiazole and cyclohexylamine | 1 |
| Alumina gel | 60 |
| Decyl-oxymethylene-pyridine chloride | 5 |

While the "Defo" value dropped from 625 to 190, the following test results were obtained:

|  | Without | With |
|---|---|---|
|  | Decyl-oxymethylene-pyridine chloride | |
| Shore hardness | 43 | 59 |
| Tear resistance, kg./cm | 7.2 | 45.5 |
| Cut growth resistance, kg./cm | 25.5 | 95 |
| Modulus at 300%, kg./cm.² | 29 | 59 |
| Modulus at 500%, kg./cm.² | 64 | 142 |
| Breaking strength, kg./cm.² | 81 | 205 |
| Abrasion, mm.³ | 378 | 283 |

Example 3

The same composition was used as in Example 2 except for the light-colored reinforcing filler. In this example, precipitated pure silica ("Durosil" made by the firm Degussa) was used. The test results obtained with and without the addition of decyl-oxymethylene-pyridine chloride, after a vulcanization period of 30 minutes, clearly indicate the beneficial effect of the addition agent.

|  | Without | With |
|---|---|---|
|  | Decyl-oxymethylene-pyridine chloride | |
| Shore Hardness | 66 | 59 |
| Tear resistance, kg./cm | 5.6 | 69 |
| Cut growth resistance, kg./cm | 22 | 67.5 |
| Modulus at 300%, kg./cm.² | 64 | 62 |
| Modulus at 500%, kg./cm.² |  | 153 |
| Breaking strength, kg./cm.² | 96 | 155 |
| Permanent elongation | 22 | 34 |
| Abrasion, mm.³ | 253 | 215 |

The "Defo" value dropped from 2000 to 1150.

Example 4

The influence of decyl-oxymethylene-pyridine chloride on a natural rubber composition containing pyrogenic silica was tested in the following formulation:

| | |
|---|---|
| Crepe, light | 100 |
| Zinc oxide | 5 |
| Sulfur | 3 |
| Reaction product of mercaptobenzothiazole and cyclohexylamine | 1 |
| Areosil (pyrogenic silica) | 20 |
| Decyl-oxymethylene-pyridine chloride | 5 |

With the "Defo" value practically unchanged (250 to 240) the test results, after a vulcanization period of 20 minutes, are as follows:

|  | Without | With |
|---|---|---|
|  | Decyl-oxymethylene-pyridine chloride | |
| Shore hardness | 20 | 47 |
| Tear resistance, kg./cm | 2.6 | 45.5 |
| Cut growth resistance, kg./cm | 9.2 | 58 |
| Modulus at 300%, kg./cm.² | 3 | 32 |
| Modulus at 500%, kg./cm.² | 10 | 93 |
| Breaking strength, kg./cm.² | 22 | 212 |
| Permanent elongation, percent | 12 | 25 |
| Abrasion, mm.³ |  | 140 |

Example 5

The influence of stearamido-methylene-pyridine chloride was tested in the following rubber formulation:

| | |
|---|---|
| Crepe rubber | 100 |
| Zinc oxide, active | 5 |
| Sulfur | 3 |
| Reaction product of mercaptobenzothiazole and cyclohexylamine | 1 |
| Alumina gel | 60 |
| Stearamido-methylene-pyridine chloride | 5 |

The "Defo" value dropped from 625 to 475, but the increased strength may be seen from the test results obtained after a vulcanization period of 20 minutes with and without the addition of stearamido-methylene-pyridine chloride, as tabulated below:

|  | Without | With |
|---|---|---|
|  | Stearamido-methylene-pyridine chloride | |
| Shore hardness | 43 | 61 |
| Tear resistance, kg./cm | 7.2 | 48 |
| Cut growth resistance, kg./cm | 25.5 | 87 |
| Modulus at 300%, kg./cm.² | 29 | 56 |
| Modulus at 500%, kg./cm.² | 64 | 139 |
| Breaking strength, kg./cm.² | 81 | 180 |
| Permanent elongation, percent | 18 | 35 |
| Abrasion, mm.³ | 378 | 217 |

Example 6

The following rubber composition was used:

| | |
|---|---|
| Crepe rubber | 100 |
| Zinc oxide, active | 3 |
| Sulfur | 3 |
| Mercaptobenzothiazole disulfide | 1 |
| Diphenyl guanidine | 0.5 |
| Chalk | 60 |

Part of this rubber composition was processed without further additions. To another portion, 3.6 parts of stearamido-methylene-pyridine chloride were added.

Both compositions were vulcanized for 15 minutes at 143° C. and the physical properties tabulated below were then determined:

|  | Without | With |
|---|---|---|
| Shore hardness | 55 | 55 |
| Tear resistance, kg./cm | 7 | 6 |
| Cut growth resistance, kg./cm | 30 | 31 |
| Modulus at 300%, kg./cm.² | 42 | 37 |
| Modulus at 500%, kg./cm.² | 125 | 114 |
| Breaking strength, kg./cm.² | 207 | 193 |
| Permanent elongation, percent | 23 | 25 |
| Abrasion, mm.³ | 293 | 267 |

From these figures, it is apparent that stearamido-methylene-pyridine chloride when used in conjunction with a chalk filler does not cause improvement in physical properties but rather a deterioration, as can be seen from the modulus at 300 and 500% and from the breaking strength. In the presence of the inactive filler, the stearamido-methylene-pyridine chloride does not act as an activator for the filler since the filler is not capable of being activated, but solely as a softener.

Example 7

The same rubber composition was compounded as in Example 6, but 60 parts of barytes were used as a filler instead of 60 parts of chalk.

A portion of this mixture was processed without further additions, to the other portion 3.6 parts of stearamido-methylene-pyridine chloride were added.

Both compositions were vulcanized for 15 minutes at 143° C. and the pyhsical properties tabulated below were then determined.

|  | Without | With |
|---|---|---|
| Shore hardness | 52 | 50 |
| Tear resistance, kg./cm | 7 | 8 |
| Cut growth resistance, kg./cm | 26 | 27 |
| Modulus at 300%, kg./cm.$^2$ | 27 | 25 |
| Modulus at 500%, kg./cm.$^2$ | 86 | 74 |
| Breaking strength, kg./cm.$^2$ | 208 | 188 |
| Permanent elongation, percent | 19 | 20 |
| Abrasion, mm.$^3$ | 292 | 278 |

Example 8

The same rubber composition was compounded as in Example 6, but 60 parts of kaolin were substituted as filler for the 60 parts of chalk.

A portion of this composition was processed without further additions, and to the other portion 3.6 parts of stearamido-methylene-pyridine chloride were added.

Both compositions were vulcanized for 15 minutes at 143° C. and the physical properties tabulated below were then determined.

|  | Without | With |
|---|---|---|
| Shore hardness | 58 | 61 |
| Tear resistance, kg./cm | 4 | 4 |
| Cut growth resistance, kg./cm | 22 | 23 |
| Modulus at 300%, kg./cm.$^2$ | 74 | 80 |
| Modulus at 500%, kg./cm.$^2$ | 182 | 178 |
| Breaking strength, kg./cm.$^2$ | 206 | 194 |
| Permanent elongation, percent | 38 | 45 |
| Abrasion, mm.$^3$ | 266 | 261 |

From these Examples 6, 7 and 8, it can be seen that the beneficial effects cannot be achieved by the addition agents alone, but only by the combination of the novel addition agents with the novel active hydrophilic light colored fillers.

Our light-colored hydrophilic reinforcing fillers constitute a new class of fillers which cause the most favorable effects when used in conjunction with our addition agents claimed, as will be clear from the inspection of the difference in the "looseness index." The looseness index is the quotient of the specific weight divided by the bulk weight and is shown hereinafter for chalk and three fillers of the invention:

Chalk:
- Specific gravity _____ 2.6
- Bulk weight, grams/liter _____ 1,000
- Quotient _____ 2.6

Aerosil (pyrogenic silica):
- Specific gravity _____ 2.2
- Bulk weight, grams/liter _____ 40
- Quotient _____ 55

Calsil (precipitated calcium silicate):
- Specific gravity _____ 2.05
- Bulk weight, grams/liter _____ 120
- Quotient _____ 17.08

AS 7 (precipitated aluminum silicate):
- Specific gravity _____ 1.95
- Bulk weight, grams/liter _____ 100
- Quotient _____ 19.05

For chalk which is an inactive filler, the looseness index is approximately 3, and for our light-colored hydrophilic reinforcing fillers (pyrogenic silica, precipitated calcium silicate, and aluminum silicate) the quotient lies between 10 and 55.

Example 9

In this example, the alumina gel of Example 5 was replaced by Durosil with a concomitant drop of the "Defo" value from 2000 to 1550. The favorable results obtained after a vulcanization period of 30 minutes show the influence of stearamido-methylene-pyridine chloride, when compared with the results obtained without this addition agent.

|  | Without | With |
|---|---|---|
|  | Stearamido-methylene-pyridine chloride | |
| Shore hardness | 66 | 75 |
| Tear resistance, kg./cm | 5.6 | 51.5 |
| Cut growth resistance, kg./cm | 22 | 103 |
| Modulus at 300%, kg./cm.$^2$ | 64 | 77 |
| Modulus at 500%, kg./cm.$^2$ |  | 176 |
| Breaking strength, kg./cm.$^2$ | 96 | 186 |
| Permanent elongation | 22 | 37 |
| Abrasion, mm.$^3$ | 253 | 240 |

Example 10

This example shows the influence of stearamido-methylene-pyridine chloride on the following rubber composition:

Crepe rubber _____ 100
Zinc oxide _____ 5
Sulfur _____ 3
Reaction product of mercaptobenzothiazole and cyclohexylamine _____ 1
Aerosil (pyrogenic silica) _____ 20
Stearamido-methylene-pyridine chloride _____ 5

Whereas the "Defo" value remains practically unchanged (from 250 to 265), the test results tabulated below clearly indicate the improvement due to the use of the alkyl-pyridine salt. The vulcanization period was 30 minutes.

|  | Without | With |
|---|---|---|
|  | Stearamido-methylene-pyridine chloride | |
| Shore hardness | 24 | 48 |
| Tear resistance, kg./cm | 3.3 | 15 |
| Cut growth resistance, kg./cm | 12 | 71 |
| Modulus at 300%, kg./cm.$^2$ | 8 | 32 |
| Modulus at 500%, kg./cm.$^2$ | 21 | 96 |
| Breaking strength, kg./cm.$^2$ | 41 | 231 |
| Permanent elongation, percent | 10 | 21 |
| Abrasion, mm.$^3$ |  | 144 |

Example 11

This example illustrates the influence of a fatty acid amidomethylene-pyridine chloride on a natural rubber composition. The fatty acid was obtained from the tails resulting from the oxidation of hydration products of carbon monoxide and contained at least 24 carbon atoms in the molecule:

Crepe rubber _____ 100
Zinc oxide, active _____ 5
Sulfur _____ 3
Reaction of products of mercaptobenzothiazole and cyclohexylamine _____ 1
Alumina gel _____ 60
Tails fatty acid amidomethylene-pyridine chloride _____ 5

With a reduced "Defo" value, the influence of the addition agent toward increasing the strength of the rubber composition can be seen from the following table. Vulcanization time was 30 minutes.

|  | Without | With |
|---|---|---|
|  |  | Tails fatty acid amido-methylene-pyridine chloride |
| Shore hardness | 40 | 57 |
| Tear resistance, kg./cm. | 6.7 | 51 |
| Cut growth resistance, kg./cm. | 28 | 103 |
| Modulus at 300%, kg./cm.$^2$ | 27 | 61 |
| Modulus at 500%, kg./cm.$^2$ | 61 | 153 |
| Breaking strength, kg./cm.$^2$ | 91 | 217 |
| Permanent elongation, percent | 21 | 37 |
| Abrasion, mm.$^3$ | 37 | 200 |

Example 12

When the alumina gel of Example 11 was replaced by Durosil (precipitated silica), after a vulcanization period of 30 minutes, the following test results were obtained while the "Defo" value of the non-vulcanized composition dropped from 2000 to 625:

|  | Without | With |
|---|---|---|
|  |  | Tails fatty acid amido-methylene-pyridine chloride |
| Shore hardness | 66 | 69 |
| Tear resistance, kg./cm. | 5.6 | 47.5 |
| Cut growth resistance, kg./cm. | 22 | 98 |
| Modulus at 300%, kg./cm.$^2$ | 64 | 68 |
| Modulus at 500%, kg./cm.$^2$ |  | 164 |
| Breaking strength, kg./cm.$^2$ | 96 | 182 |
| Permanent elongation, percent | 22 | 35 |
| Abrasion, mm.$^3$ | 253 | 247 |

Example 13

The test results tabulated below indicate the excellent influence of the tails fatty acid amidomethylene-pyridine chloride of a natural rubber composition containing pyrogenic silica and having the following formula:

| Crepe rubber | 100 |
|---|---|
| Zinc oxide | 5 |
| Sulfur | 3 |
| Reaction product of mercaptobenzothiazole with cyclohexylamine | 1 |
| Aerosil (pyrogenic silica) | 20 |
| Tails fatty acid amidomethylene-pyridine chloride | 5 |

|  | Without | With |
|---|---|---|
|  |  | Tails fatty acid amido-methylene-pyridine chloride |
| Shore hardness | 24 | 51 |
| Tear resistance, kg./cm. | 3.3 | 46.5 |
| Cut growth resistance, kg./cm. | 12 | 95 |
| Modulus at 300%, kg./cm.$^2$ | 8 | 38 |
| Modulus at 500%, kg./cm.$^2$ | 21 | 109 |
| Breaking strength, kg./cm.$^2$ | 41 | 227 |
| Permanent elongation, percent | 10 | 26 |
| Abrasion, mm.$^3$ |  | 138 |

The "Defo" value of the non-vulcanized mixture drops from 250 to 165.

Example 14

This example shows the influence of the oleoyl-N-methyl-amidomethylene-pyridine chloride paste on the strength of the following rubber composition:

| Crepe rubber | 100 |
|---|---|
| Zinc oxide, active | 3 |
| Sulfur | 3 |
| Mercaptobenzothiazole disulfide | 1 |
| Diphenyl-guanidine | 0.5 |
| Alumina gel | 60 |
| Oleoyl-N-methyl-amidomethylene-pyridine chloride | 3.6 |

After a vulcanization period of 60 minutes, test results were obtained which are shown in the following table:

|  | Without | With |
|---|---|---|
| Shore hardness | 56 | 70 |
| Tear resistance, kg./cm. | 11 | 52 |
| Cut growth resistance, kg./cm. | 48 | 74 |
| Modulus at 300%, kg./cm.$^2$ | 56 | 75 |
| Modulus at 500%, kg./cm.$^2$ | 132 | 164 |
| Breaking strength, kg./cm.$^2$ | 180 | 189 |
| Elongation, percent | 577 | 547 |

It will be apparent that while we have described our invention in several forms, many changes and modifications may be made without departing from the spirit of the invention defined in the following claims.

We claim:

1. Process for the manufacture of rubber vulcanizates, which comprises subjecting natural rubber compositions and light-colored hydrophilic fillers selected from the group consisting of synthetically produced oxides, and synthetically produced hydrates, of a metal selected from the group consisting of silicon and aluminum, in the absence of organic solvents and in the presence of quaternary alkyl-pyridine compounds, to vulcanization, the quaternary alkyl-pyridine compounds splitting off the reactive alkyl groups under the conditions of vulcanization.

2. In the process according to claim 1, using alkyl-oxymethylene-pyridine salts as said quaternary alkyl-pyridine compounds.

3. In the process according to claim 1, using a fatty acid amidomethylene-pyridine salt as a quaternary alkyl-pyridine compound.

4. In the process according to claim 3, using a fatty acid amidomethylene-pyridine salt selected from the group consisting of a derivative thereof alkylated at the amido nitrogen and a stearamido-methylene-pyridine salt.

5. In the process according to claim 1, using a fatty acid N-alkyl-amidomethylene-pyridine salt as a quaternary alkyl-pyridine compound.

6. In the process according to claim 5, using oleoyl-N-methyl-amidomethylene-pyridine chloride.

7. In the process according to claim 2, using decyl-oxymethylene-pyridine salt.

8. In the process according to claim 2, using octadecyl-oxymethylene-pyridine salt.

References Cited in the file of this patent

UNITED STATES PATENTS

| 2,131,244 | Williams | Sept. 27, 1938 |
| 2,656,250 | Thibon et al. | Oct. 20, 1953 |
| 2,732,360 | Voigt et al. | Jan. 24, 1956 |

OTHER REFERENCES

Barron: "Modern Rubber Chemistry," D. Van Nostrand Co., Inc., 1948 (pages 163 and 203 relied on).